(12) United States Patent
Pfleging et al.

(10) Patent No.: US 10,763,514 B2
(45) Date of Patent: Sep. 1, 2020

(54) ELECTRICALLY CONDUCTIVE BASE MATERIAL AND LAYER COMPOSITE, METHOD FOR PRODUCING THE SAME, AND USE OF THE SAME

(71) Applicant: KARLSRUHER INSTITUT FUER TECHNOLOGIE, Karlsruhe (DE)

(72) Inventors: Wilhelm Pfleging, Linkenheim (DE); Johannes Proell, Karlsruhe (DE); Yijing Zheng, Eggenstein (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 232 days.

(21) Appl. No.: 15/764,072

(22) PCT Filed: Sep. 28, 2016

(86) PCT No.: PCT/EP2016/073054
§ 371 (c)(1),
(2) Date: Mar. 28, 2018

(87) PCT Pub. No.: WO2017/055323
PCT Pub. Date: Apr. 6, 2017

(65) Prior Publication Data
US 2018/0316020 A1    Nov. 1, 2018

(30) Foreign Application Priority Data

Sep. 30, 2015  (DE) .................. 10 2015 218 907

(51) Int. Cl.
*H01M 4/78*    (2006.01)
*H01M 4/66*    (2006.01)
(Continued)

(52) U.S. Cl.
CPC .......... *H01M 4/78* (2013.01); *B23K 26/0624* (2015.10); *H01M 4/0404* (2013.01);
(Continued)

(58) Field of Classification Search
CPC ...... H01M 4/78; H01M 10/0525; H01M 4/04; H01M 4/66; H01M 4/661; H01M 4/0404;
(Continued)

(56) References Cited

U.S. PATENT DOCUMENTS 8,962,190 B1    2/2015 Gross et al.
2005/0019659 A1*  1/2005 Shiozaki ............... H01M 4/505
                                                   429/231.3
(Continued)

FOREIGN PATENT DOCUMENTS

DE    102008016682 A1    12/2008
JP       2007149612   *  11/2005
(Continued)

OTHER PUBLICATIONS

JP 2007149612MT (Year: 2007).*
(Continued)

*Primary Examiner* — Alexander Usyatinsky
(74) *Attorney, Agent, or Firm* — J.A. Lindeman & Co. PLLC (57) ABSTRACT

The invention relates to an electrically conductive base material (112) for receiving a coating material (114) which comprises electrically conductive particles (116), a method for the production thereof and the use thereof as current collector for an electrode material comprising electrically conductive particles. The base material (112) comprises a metal foil, wherein at least one surface (118) of the base material (112) provided for receiving the electrically conductive particles (116) has a first structure (120) and a second structure (122), wherein the first structure (120) has first ridges (124) and/or first grooves (126) relative to the surface (118) of the base material (112) and wherein the second structure (122) has second ridges (128) and/or second grooves (130) relative to the surface (132) of the first (Continued)

structure (120). Herein, the first ridges (124) and/or the first grooves (126) have first dimensions, wherein the second ridges (128) and/or the second grooves (130) have second dimensions, wherein the first dimensions exceed the second dimensions by a factor of at least 10.

The invention further relates to an electrically conductive layer composite (110) which comprises the base material (112) and a coating material (114) comprising electrically conductive particles (116), a method for the production thereof and the use thereof in a secondary element of a rechargeable battery, in particular in a lithium ion battery. Herein, the particles (116) in the coating material (114) adhere to first ridges (124) and/or to first grooves (126) in a first structure (120) on the surface (118) of the base material (112) and/or to second ridges (128) and/or to second grooves (130) in a second structure (122) on the surface (132) of the first structure (120). A good bonding of the coating material (114) to the base material (112) reduces or prevents a layer delamination of the coating material (114) from the base material (112).

11 Claims, 4 Drawing Sheets

(51) Int. Cl.
| | | |
|---|---|---|
| *H01M 10/0525* | (2010.01) | |
| *B23K 26/0622* | (2014.01) | |
| *H01M 4/04* | (2006.01) | |
| *B23K 101/34* | (2006.01) | |
| *B23K 101/38* | (2006.01) | |
| *H01M 4/02* | (2006.01) | |

(52) U.S. Cl.
CPC ....... *H01M 4/661* (2013.01); *H01M 10/0525* (2013.01); *B23K 2101/35* (2018.08); *B23K 2101/38* (2018.08); *H01M 2004/021* (2013.01); *Y02T 10/7011* (2013.01)

(58) Field of Classification Search
CPC ......... H01M 2004/021; B23K 26/0622; B23K 26/0624; B23K 2101/38; B23K 2101/35; Y02T 10/7011
See application file for complete search history.

(56) References Cited

U.S. PATENT DOCUMENTS

| | | | |
|---|---|---|---|
| 2006/0199078 A1* | 9/2006 | Koshina | H01M 4/5815 |
| | | | 429/231.95 |
| 2008/0248368 A1 | 10/2008 | Dadheech et al. | |
| 2009/0280407 A1 | 11/2009 | Ito et al. | |
| 2014/0170451 A1* | 6/2014 | Iwasaki | H01M 4/661 |
| | | | 429/90 |
| 2015/0318553 A1 | 11/2015 | Brandt | |
| 2016/0204431 A1* | 7/2016 | Sawa | H01M 4/134 |
| | | | 429/218.1 |

FOREIGN PATENT DOCUMENTS

| | | |
|---|---|---|
| JP | 2007149612 A | 6/2007 |
| WO | 2014/090892 A1 | 6/2014 |
| WO | WO 2015045341 * | 4/2015 |

OTHER PUBLICATIONS

Zhulke et al, Applied Surface Science 283 (2013) 648-653 (Year: 2013).*

16770947, Decision_to_grant_a_European_patent,dated Oct. 4, 2019 (Year: 2019).*

Cao Cuong Nguyen and Seung-Wan Song "Interfacial structural stabilization on amorphous silicon anode for improved cycling performance in lithium-ion batteries", Electrochimica Acta 55, 2010, pp. 3026-3033.

Nikolic et al., "The effect of hydrogen codeposition on the morphology of copper electrodeposits. I. The Concept of effective overpotential", Journal of Electroanalytical Chemistry, 2006, 588, pp. 88-98.

Shin et al., "Nanoporous Structures Prepared by an Electrochemical Deposition Process", Adv. Mater., 2003, 15, No. 19, pp. 1610-1614.

Zuhlke et al., "Fundamentals of layered nanoparticle covered pyramidal structures formed on nickel during femtosecond laser surface interactions", Applied Surface Science, 2013, vol. 283, pp. 648-653.

English translation of International Preliminary Report on Patentability in International Application No. PCT/EP2016/073054, dated Apr. 3, 2018.

* cited by examiner

ELECTRICALLY CONDUCTIVE BASE MATERIAL AND LAYER COMPOSITE, METHOD FOR PRODUCING THE SAME, AND USE OF THE SAME

FIELD OF THE INVENTION

The invention relates to an electrically conductive base material, a method for the production thereof and the use thereof as current collector for an electrode material comprising electrically conductive particles. The invention further relates to an electrically conductive layer composite comprising the base material, a method for the production thereof and the use thereof in a secondary element of a rechargeable battery, in particular in a lithium ion battery.

PRIOR ART

The invention is in the field of secondary elements in rechargeable batteries, in particular in lithium ion batteries. Technical development in this field is driven first and foremost by the increasing demand for high-performance energy stores in hybrid, plug-in or fully electric vehicles or as stationary energy stores within linked power generators, consumers and distributors.

In the rechargeable secondary elements of rechargeable batteries, electrically conductive multiscale material composites or power-based electrodes which comprise electrically conductive particles, in particular primary particles, aggregates and/or agglomerates having dimensions of 10 nm to 100 µm, are frequently used as electrodes, especially in lithium ion batteries. In the coating of current collectors, which are usually in the form of current collector foils, with a slurry, which can comprise solvents, conductivity additives, polymeric binders and the electrically conductive active particles, the problem is to obtain sufficient mechanical and electrical bonding of the layer-like electrode produced from the slurry to the current collector. Unsatisfactory bonding of the layer-like electrode to the current collector can lead to partial or complete layer delamination before and/or after electrochemical stressing of the secondary element, which can cause premature failure of the secondary element. Very good layer adhesion is therefore a method step which influences the electrode quality, the performance of the rechargeable battery in operation and possible production failures in the assembly of the secondary elements.

However, current collector foils known at present from the prior art generally have a thickness of 8 to 18 µm and have virtually identical, homogeneous surfaces having a roughness Rz of 0.5 µm to 2 µm on both sides, so that they are not designed for coupling to electrically conductive active particles in the form of multiscale material composites. Furthermore, the electrode material which is in contact with such a homogeneous surface cannot be subjected to any particularly high volume changes without possibly losing the bond to the current collector. This property is disadvantageous, especially in respect of the life and cycling stability of the rechargeable batteries equipped therewith, both for lithium ion batteries and also for future high-capacity secondary elements based, for example, on silicon, lithium-sulfur or tin oxide, in the case of which volume changes of 400% (for comparison graphite about 5%) have to be expected because of an increase in capacity.

Typical foil materials are aluminum and copper. The aluminum foil is here usually used as current collector on the cathode and is typically coated on both sides with $LiNi_{x^-}Mn_yCo_zO_2$ (NMC), $LiFePO_4$ (LFP), $LiCoO_2$ (LCO) or $LiMn_2O_4$ (LMO). The copper foil, on the other hand, is usually employed as current collector on the anode and is typically coated on both sides with graphite. In lithium ion batteries, use is at present made mainly of two types of copper foils, firstly rolled foils (roll-annealed (RA) copper foil) and electrolytically deposited foils (electrodeposited (ED) copper foil). In respect of the layer adhesion, the copper foil in particular is found to be disadvantageous here, since the formation of a solid electrolyte interphase, chemical degradation and the integral volume changes which can become apparent as swelling of the layer composite are particularly pronounced there. This can, as described above, lead to delamination of the layers and to premature failure of the secondary elements concerned.

Manufacturers of current collector foils have recognized the above-described problems of electrode layer adhesion and have proposed various foil after-working steps, firstly use of electrochemical deposition (see H. C. Shin, J. Dong and M. L. Liu, *Nanoporous structures prepared by an electrochemical deposition process*, Adv. Mater. 2003, 15 (19), pp. 1610-1614, N. D. Nikolic, K. I. Popov, L. J. Pavlovic and M. G. Pavlovic, *The effect of hydrogen codeposition on the morphology of copper electrodeposits I The concept of effective overpotential*, J. Electroanalyt. Chem., 2006, 588 (1), pp. 88-98), and secondly use of etching processes (see C. C. Nguyen and S. W. Song, *Interfacial structural stabilization on amorphous silicon anode for improved cycling performance in lithium-ion batteries*, Electrochim. Acta 2010, 55 (8), pp. 3026-3033). However, these process steps have been found to be inefficient, environmentally polluting and complicated. In addition, they brought inhomogeneous results, which were reflected in the formation of spikes.

WO 2014/090892 A1 discloses a composite material which comprises a particle-comprising coating material and a base material, in particular a particle electrode and a current collector, where the base material has grooves on its surface, which at the site of the grooves lead to a reduced thickness of the base material, and the grooves represent deviations from a flat surface of the base material. Here, the geometric dimensions and/or the shapes of the particles and the grooves are matched to one another in such a manner that one or more particles fit geometrically entirely or partly into the individual grooves or have been pushed so strongly into them by the action of force and/or energy that the adhesion is based at least partly on mechanical forces between the particles and the base material. For this purpose, it is proposed firstly that the structure and the surface geometry of the current collector be prepared and altered by mechanical roughening using sandblasting or sandpaper of suitable grain size or by point-precise laser treatment for perforation or surface-structuring of the base material, for example using ultrashort pulse laser treatment, in order to improve the adhesion of the electrode particles to the surface of the current collector. Secondly, the surface geometry of the particles can be matched to the surface structure of the current collector, in particular by alteration of the particle geometry by milling or sieving and/or by selection of the production of the particles, e.g. the chemical precipitation conditions.

U.S. Pat. No. 8,962,190 B1 discloses electrodes which have an electrically conductive, porous layer, an energy storage material and electrically conductive ridges which extend out from the layer into the energy storage material. The porous layer serves, in particular, for receiving a liquid electrolyte which compared to the metal ions has a higher ionic conductivity for metal ions, e.g. $Li^-$, whereby the ridges form paths for the metal ions which can in this fashion be introduced more quickly and/or deeper into the metal ions.

DE 10 2008 016 682 A1 discloses a process for microstructuring elements of a fuel cell, which is used in order to improve water management. To produce the microstructuring, surface material of a separator plate and/or a gas diffusion medium is selectively ablated, in particular by use of laser pulses.

OBJECT OF THE INVENTION

Therefore, it is an object of the present invention to propose an electrically conductive base material, a method for the production thereof and the use thereof and also an electrically conductive layer composite comprising the base material, a method for the production thereof and the use thereof, which at least partly overcome the above-described disadvantages and limitations of the prior art.

In particular, the invention should improve the properties and performance of the electrode material in a secondary element of a rechargeable battery, especially in a lithium ion battery, particularly when multiscale material composites or power-based electrodes are used as coating material. For this purpose, the electrically conductive base material, in particular, should be configured so that a good bond between electrically conductive particles in the electrode material and the facing surface of the base material is formed and maintained even when the electrode material is subjected to large volume changes. Furthermore, methods shall be disclosed which allow very simple production of the electrically conductive base material and of the layer composite comprising the base material. Finally, preferred uses of the base material and of the layer composite shall be indicated.

DISCLOSURE OF THE INVENTION

This object is achieved by an electrically conductive base material, a method for the production thereof and the use thereof and also by an electrically conductive layer composite comprising the base material, a method for the production thereof and the use thereof having the features of the independent claims. Advantageous embodiments, which can be realized individually or in any combination, are presented in the dependent claims.

In the following, the terms "have", "comprise" or "include" or any grammatical variations thereof are used in a nonexclusive sense. Accordingly, these terms can apply both to situations in which no further features are present in addition to the features introduced by these terms and to situations in which one or more further features are present. For example, the expression "A has B", "A comprises B" or "A includes B" can refer both to the situation in which no further element apart from B is present in A (i.e. to a situation in which A consists exclusively of B) and to the situation in which one or more elements in addition to B are present in A, for example element C, elements C and D or even further elements.

Furthermore, it may be pointed out that the terms "at least one" and "one or more" and also grammatical variations of these terms are, when they are used in connection with one or more elements or features and are intended to indicate that the element or feature can be present one or more times, generally used only once, for example in the first introduction of the feature or element. In a subsequent renewed mention of the feature or element, the corresponding term "at least one" or "one or more" is generally no longer used, without ruling out the possibility that the feature or element can be present one or more times.

Furthermore, the terms "preferably", "in particular", "for example" or similar terms are used below in connection with optional features, without alternative embodiments being ruled out thereby. Thus, features which are introduced by these terms are optional features, and it is not intended that the scope of protection of the claims and in particular the independent claims be restricted by these features. The invention thus can, as a person skilled in the art will realize, also be carried out using other embodiments. In a similar manner, features which are introduced by "in one embodiment of the invention" or by "in one working example of the invention" are optional features, without alternative configurations or the scope of protection of the independent claims being restricted thereby. Furthermore, all possibilities of combining the features introduced thereby with other features are intended to be left open by these introductory expressions.

In a first aspect, the present invention provides an electrically conductive base material which is designed for receiving a coating material comprising electrically conductive particles. In the context of the present invention, the term "electrically conductive" can relate to electronic conductivity and/or to ionic conductivity. Base materials employed here are metal foils, preferably having a thickness of 5 µm to 50 µm, in particular of 10 µm to 20 µm. Suitable materials for the metal foil are, in particular, copper, aluminum, nickel, lithium, doped and/or metallized silicon, metallized polymer films, gold and silver; however, further materials are conceivable.

In the present context, the term "receiving" refers to application of the coating material to the surface configured according to the present invention of the base material, for which purpose, in particular, the inventive method described in more detail below can be used. Here, the coating material can be applied, in particular in the form of a thin layer which can preferably have a thickness of 100 nm to 1000 µm, to the surface of the base material provided for receiving the coating material, preferably in such a manner that the electrically conductive particles present in the coating material, which are also referred to as "active particles", experience very good adhesion to the surface of the base material. The surface of the base material can preferably be structured in such a manner that, on application of the coating by, for example, application of a slurry to the surface in a pourable slip present in the slurry, intermeshing of the electrically conductive particles and the surface of the base material occurs. The structure of the surface is preferably configured in such a manner that the multiscale particles, which can have dimensions of 10 nm up to 100 µm, can, independently of their size, form suitable coupling structures on the surface.

According to the present invention, the surface of the base material provided for receiving the electrically conductive particles is configured in such a manner that it has a hierarchical structure. In addition, further regions of the surface of the base material can also be configured in this fashion, for example, for process reasons. In the present context, the term "hierarchical structure" refers to a configuration of the surface of the base material in such a manner that the surface has a texture which has a multiscale topography. Especially for practical reasons, namely that introduction of further scales is generally associated with higher costs, the texture of the surface of the base material has a two-scale topography which has the textures referred to in the following as "first structure" and as "second structure". Here, the term "topography" means ridges and/or grooves relative to a level of a fixed surface, which for this purpose can be considered to be a flat area, with the term "scale" indicating the spatial dimensions and/or spacings of the grooves and/or ridges in each case. Consequently, the first ridges and/or first grooves have first dimensions, while the second ridges and/or second grooves have second dimensions.

According to the present invention, the first structure has first ridges and/or first grooves relative to the surface of the base material, while the second structure has second ridges and/or second grooves relative to the surface of the first structure. The difference described here in respect of which surface the ridges and/or grooves are relative to in each case forms the basis of the first dimensions exceeding the second dimensions by, according to the invention, a factor of at least 10. In a preferred embodiment, the first dimensions assume a value of 1 μm to 100 μm and the second dimensions assume a value of 100 nm to 2000 nm. In a particularly preferred embodiment, the first dimensions assume a value of 1 μm to 50 μm, preferably of 5 μm to 20 μm, and the second dimensions assume a value of 200 nm to 1000 nm, preferably of 300 nm to 900 nm. The dimensions here relate to a structural size of the corresponding ridges and/or grooves, for example to the lateral width thereof or, preferably, to lateral spacings between individual ridges and/or grooves.

The surface of the base material configured in this manner has a hierarchical structure. This type of topography makes it possible for the multiscale particles occurring in the coating material, which can have dimensions of 10 nm up to 100 μm, to form, independently of their size, in each case suitable coupling structures on the surface. In addition, these structures can additionally act as capillary transport structures in order to assist, as described below, very homogeneous spreading of the pourable slip. As described further below, both the first structure and the second structure can be produced simultaneously by treatment of the surface of the base material using ultrashort pulse laser radiation.

In a particular embodiment, the unstructured base material additionally has a separate layer, preferably a separate homogeneous layer, composed of a further electrically conductive material. For example, a copper foil can serve as unstructured base material, with a thin nickel layer being applied as the further layer to the copper foil. However, other combinations of materials are conceivable. In this embodiment, the surface of the structured base material can have a hierarchical structure such that the first structure has first grooves at the surface of which the material of the base material is exposed, while the second structures are in the form of second grooves and/or second ridges in the material of the base material. In this manner, a topography which can also be referred to as "chemical pattern" can occur on the surface of the base material which has been configured in this manner. In the abovementioned example of the thin magnetic nickel layer on the nonmagnetic copper foil, magnetic regions can alternate with nonmagnetic regions over the area of the surface of the base material. This combination of a chemical pattern with the topography described enables the multiscale mechanical anchoring to be supplemented by chemical anchoring of the coating material. Further preferred embodiments relate to introduction of different functional structural groups on the various regions, e.g. influencing of wetting behavior by, for example, introduction of polar or nonpolar groups for non-aqueous or aqueous slips.

In a further aspect, the present invention provides an electrically conductive layer composite which comprises at least one electrically conductive base material as described above or below and a coating material comprising electrically conductive particles. Here, the term "electrically conductive" can relate to electronic conductivity and/or ionic conductivity of the particles, which can also be referred to as "active particles". If the layer composite is used as cathode, active particles comprising $LiNi_xMn_yCo_zO_2$ (NMC), $LiFePO_4$ (LFP), $LiCoO_2$ (LCO), $LiMn_2O_4$ (LMO) or sulfur (S)/lithium-sulfur (Li—S) are typically used in the coating material for example in the case of lithium ion batteries. If, on the other hand, the layer composite is used as anode, active particles comprising carbon modifications, silicon, graphite/silicon mixtures, tin oxides, lithium titanates or metallic lithium are typically used. As carbon modifications, it is possible to use, regardless of whether these have predominantly $Sp^2$ or $Sp^3$ bonding, various types of graphites, for example synthetic graphites, natural graphites or graphite flakes, graphenes, fullerenes, single-wall or multiwall carbon nanotubes or mixtures thereof. However, other materials are conceivable.

In addition, further constituents, preferably conductivity additives, e.g. conductive carbon black, can be provided in the layer composite, in particular to improve the electrical conductivity in the coating material, and/or polymeric binders, e.g. polyvinylidene fluoride (PVDF), in particular to improve the bonding of the electric particles between one another and in particular to the surface of the base material. Both the electrically conductive active particles and also the conductivity additives and/or polymeric binders can preferably be present in the form of primary particles, aggregates and/or agglomerates having dimensions of 10 nm to 100 μm, which in a particular embodiment can be divided into two separate size ranges in the nanometer range, in particular of 10 nm to 100 nm, and in the micron range, in particular of 1 μm to 50 μm.

The layer composite is, according to the invention, configured so that the particles adhere to first ridges and/or first grooves in a first structure on the surface of the base material and/or to second ridges and/or second grooves in a second structure on the surface of the first structure. This type of topography makes it possible for the multiscale particles present therein to form, regardless of their size over at least part of the range of 10 nm to 100 μm, in each case suitable coupling structures on the surface. This applies particularly in the case where, in the coating material, the active particles can have been introduced into a phase which can comprise polymeric binders and/or conductivity additives, and also to a configuration in which the active particles are to become distributed over the abovementioned two separate size ranges, for example of 10 nm to 100 nm (nanometer range) and of 1 μm to 50 μm (micron range). In contrast to the prior art, the electrically conductive base material described above or below is therefore particularly suitable for receiving such a coating material.

For further details of the layer composite, reference is made to the description of the base material of the invention.

In a further aspect, the present invention provides a method for producing an electrically conductive base material for receiving a coating material comprising electrically conductive particles, in particular for producing a base material as described above or below. The method here comprises the following steps a) and b) which are preferably carried out in the indicated order, commencing with step a) and ending with step b), with the two steps also being able to be carried out at least partially simultaneously:

a) providing an unstructured electrically conductive base material in the form of a metal foil; and b) treating at least one surface of the base material provided for receiving the electrically conductive particles using ultrashort pulse laser radiation, whereby a first structure in the form of first ridges and/or of first grooves relative to the surface of the base material and at the same time a second structure in the form of second ridges and/or of second grooves relative to the surface of the first structure are generated in such a manner that the first ridges and/or the first grooves have first dimensions and the second ridges and/or the second grooves have second dimensions, whereby the first dimensions are generated larger than the second dimensions by a factor of at least 10.

In step a), an unstructured electrically conductive base material is provided. Here, metal foils, preferably having a thickness of 5 μm to 50 μm, in particular of 10 μm to 20 μm, are provided as base material. Suitable materials for the metal foil are preferably copper, aluminum, nickel, lithium, doped and/or metallized silicon, metallized polymer foils, gold and silver; however, other materials are conceivable.

In step b), at least one surface of the base material provided for receiving the electrically conductive particles is treated using ultrashort pulse laser radiation. This generates a first structure in the form of first ridges and/or first grooves relative to the surface of the base material and simultaneously a second structure in the form of second ridges and/or second grooves relative to the surface of the first structure in such a manner that the first ridges and/or the first grooves have first dimensions and the second ridges and/or second grooves have second dimensions, with the first dimensions being greater than the second dimensions by a factor of at least 10. In a particularly preferred embodiment, the treatment of at least the surface of the base material provided for receiving the electrically conductive particles using the ultrashort pulse laser radiation is carried out in such a manner that the first dimensions can be set to of 1 μm to 100 μm, preferably of 1 μm to 50 μm, particularly preferably of 5 μm to 20 μm, and the second dimensions can be set to of 100 nm to 2000 nm, preferably of 200 nm to 1000 nm, particularly preferably of 300 nm to 900 nm.

In a particularly preferred embodiment, the ultrashort pulse laser radiation can be generated using a femtosecond laser and/or a picosecond laser, wherein, in particular, the following parameters can be selected within the following parameter ranges for the laser radiation:

pulse length of 50 fs to 100 ps, in particular of 300 fs to 100 ps;

wavelength of 190 nm to 3 μm, in particular of 255 nm to 1100 nm;

pulse frequency of 1 Hz to 100 MHz, in particular of 100 kHz to 10 MHz;

laser power of 1 mW to 1 kW, in particular of 100 mW to 200 W; and focus diameter of 1 μm to 1000 μm, in particular of 5 μm to 100 μm.

Selection of the parameters for the laser radiation within the parameter ranges indicated enables, in particular, thermal input into the base material and associated formation of melt on the surface of the base material to be avoided. Furthermore, treatment of the surface of the base material using ultrashort laser pulses makes it possible to employ a further effect, namely the formation of "nanoripple structures" on a metallic surface of the base material. The term nanoripple structures here refers to a topography on the irradiated surface of the base material which is in the form of a plurality of parallel grooves having second dimensions, in particular in the abovementioned preferred range or particularly preferred range. To form the nanoripple structures, which can, in particular, be in the form of self-organized nanostructuring, detailed matching of the process parameters possible for the ultrashort pulse laser radiation used is preferably required.

In this particularly preferred embodiment, hierarchical structuring on the base material with first structures in the micron range and with second structures in the nanometer range can in this fashion be carried out in one process step. The production method can preferably be carried out in ambient air; however, various process gas atmospheres, e.g. composed of He, $N_2$, Ar or gas mixtures of these and further gases, are also suitable. As a result of the use of the present method, post-processing, in particular, is no longer necessary for the same quality of structuring, is are still possible.

In a further aspect, the present invention provides a method for producing an electrically conductive layer composite which comprises at least one electrically conductive base material as described above or below and a coating material comprising electrically conductive particles, in particular for producing a layer composite as described above or below. The method here comprises the following steps c) to e), which are preferably carried out in the order indicated, commencing with step c) and ending with step e), with two or more of the steps being able to be carried out at least partly simultaneously:

c) applying a slurry into which at least one solvent and the electrically conductive particles have been introduced to the surface of a base material as described below or above or of a base material produced according to a description as above or below provided for receiving the electrically conductive particles;

d) dispensing the slurry by capillary action over the surface of the base material; and e) drying the slurry.

If the base material is produced according to the steps a) and b) described above or below, the steps can be followed by the steps c) and e) indicated.

In step c), a slurry, which can in particular be present in the form of a pourable slip, is applied to the surface provided for receiving the electrically conductive particles of the electrically conductive base material, which is preferably used in the form of a current collector foil as current collector. Here, the term "current collector" refers to an electrically conductive material which is designed for producing an electrically conductive connection between an element of a rechargeable battery and an associated electric connection.

The dispensation of the slurry over the surface of the base material in step d) occurs by capillary action, which is exerted on the surface of the base material. As explained in more detail above and below, the topography in the form of a hierarchical structure present on the surface of the base material according to the present invention can additionally act as capillary transport structure in order to facilitate very homogeneous distribution of the slurry. The electrically conductive particles, which are preferably used in the form of primary particles, aggregates and/or agglomerates having dimensions of 10 nm to 100 μm, can firstly be used in the slurry. If the base material is used as current collector on the cathode, active particles comprising $LiNi_xMn_yCo_zO_2$ (NMC), $LiFePO_4$ (LFP), $LiCoO_2$ (LCO), $LiMn_2O_4$ (LMO) or sulfur (S)/lithium-sulfur (Li—S) are typically used in the slurry, for example in the case of lithium ion batteries. If, on the other hand, the base material is used as current collector on the anode, active particles comprising carbon modifications, silicon, graphite/silicon mixtures, tin oxides, lithium titanates or metallic lithium are typically used. As carbon modifications, it is possible to use various types of graphites, for example synthetic graphites, natural graphites or graphite flakes, graphenes, fullerenes, single-wall or multiwall carbon nanotubes or mixtures thereof. However, other materials are possible.

Secondly, the slurry comprises at least one solvent, as a result of the vaporization of which the drying or allowing to dry of the slurry as per step e) is assisted. N-Methyl-2-pyrrolidone (NMP) is typically used as solvent; however, other solvents, in particular water-based solvents, are conceivable. In addition, the slurry can comprise further constituents, preferably conductivity additives, e.g. carbon black, in particular for improving the electrical conductivity in the future electrode material, and/or at least one polymeric binder, e.g. polyvinylidene fluoride (PVDF), in particular for improving the bonding of the electrical particles with one another and to the surface of the base material. Here, the conductivity additives and/or polymeric binders together with the electrically conductive active particles can preferably be present in the form of primary particles, aggregates and/or agglomerates having dimensions of 10 nm to 100 µm, which in a particular embodiment can be divided into two separate size ranges in the nanometer range, in particular of 10 nm to 100 nm, and in the micron range, in particular of 1 µm to 50 µm.

The good bonding of the layer-like electrode produced in this manner to the current collector which can be achieved thereby can, in particular, reduce or prevent layer delamination of the electrode material from the base material and improve electrical contact between layer and current collector.

For further details in respect of the present production methods, reference is made to the respective description of the objects which can be produced thereby.

In a further aspect, the present invention provides for a preferred use of the electrically conductive base material as current collector for an electrode material comprising electrically conductive particles. As described above, the term "current collector" refers to an electrically conductive material which is designed for generating an electrically conductive connection between an element of a rechargeable battery and an associated electric connection.

In a further aspect, the present invention provides for a preferred use of the electrically conductive layer composite which comprises at least one electrically conductive base material in a secondary element of a rechargeable battery, in particular in a lithium ion battery. As mentioned above, the term "electrically conductive" can, in connection with the present invention, refer both to electronic conductivity and to ionic conductivity. In addition, the layer composite can also be used in future high-capacity secondary elements, for example secondary elements based on silicon, lithium-sulfur or tin oxide. However, use in further rechargeable batteries is conceivable. In the present context, the term "secondary element" refers to a single rechargeable storage element for electric energy, in particular in contrast to a primary element which is not rechargeable or has only limited rechargeability. To produce a rechargeable storage element, a layer composite configured as cathode and a layer composite configured as anode, separated from one another by a separator, can in each case be assembled. An assembly of the secondary elements connected in series and/or connected in parallel is usually referred to as "rechargeable battery".

For further details in respect of the present uses, reference is made to the respective description of the associated objects.

In a further aspect, the present invention provides a rechargeable battery which has at least one electrically conductive layer composite according to the invention which comprises at least one electrically conductive base material according to the invention in at least one secondary element. The rechargeable battery can be, in particular, a lithium ion battery; however other types of rechargeable batteries which have secondary elements, for example secondary elements based on silicon, lithium-sulfur or tin oxide, are likewise conceivable. For further details in respect of the rechargeable battery, reference is made to the remaining description.

ADVANTAGES OF THE INVENTION

The present invention has a number of advantages over the base materials known from the prior art and layer composites comprising base materials and the associated production processes, especially in respect of the uses which are preferred in each case.

The invention described can improve the power of the electrodes present in a secondary element, in particular when the abovementioned electrically conductive multiscale material composites or power-based electrodes which have electrically conductive particles, in particular primary particles, aggregates and/or agglomerates having dimensions of 10 nm to 100 µm, are used. The use of hierarchically structured surfaces for the current collector makes it possible to use new types of electrode materials which have hitherto been able to be used only to a very limited extent because of poor bonding to the current collector due to the coating process and also as a result of the occurrence of high volume expansions during electrochemical cycling and subsequent delamination. Long cycling lives and improved mechanical layer properties are advantageously also obtained as a result. Owing to the improved layer adhesion, the flexibility in the selection of a possible cell design, e.g. rolled cells, pouch cells or prismatic cells, is increased.

In the individualization of the electrodes by stamping and in the welding together of the electrode/separator dry stack by ultrasonic welding, considerable local mechanical stresses which owing to the brittle behavior can lead to delamination or failure of a layer have hitherto occurred. These quality- and/or life-determining processes can be improved by the surface structuring according to the invention of the current collector and/or by selective modification in critical zones, in particular at the edge regions and the weld contacts. The local hierarchical texturing at the edges of the coating can additionally lead to a significant reduction in local thickening of the layer and, as a result of the capillary action during coating, lead to homogenization of the layer thickness over the entire coated region, which can, in particular, assist saving of active material and facilitate defined cell conditions, defined electrode thickness and defined loading. The channels in the current collectors can be used as capillaries for the electrolyte and thus homogenize wetting in the production of the layer composite. Overall, the more homogeneous coating process can result in less solvent being necessary, the drying process being shortened and being more robust, which altogether can be utilized to increase the production throughput in the production of the secondary elements.

BRIEF DESCRIPTION OF THE FIGURES

Further details and features of the present invention can be derived from the following description of preferred working examples, in particular in conjunction with the dependent claims. Here, the respective features can be realized either alone or in a combination of a plurality thereof. The invention is not restricted to the working examples.

The working examples are depicted schematically in the following figures. Here, identical reference numerals in the figures denote elements which are the same or have the same function or elements which correspond to one another in respect of their functions.

Specifically, the figures show.

DESCRIPTION OF THE WORKING EXAMPLES

Figure 1:
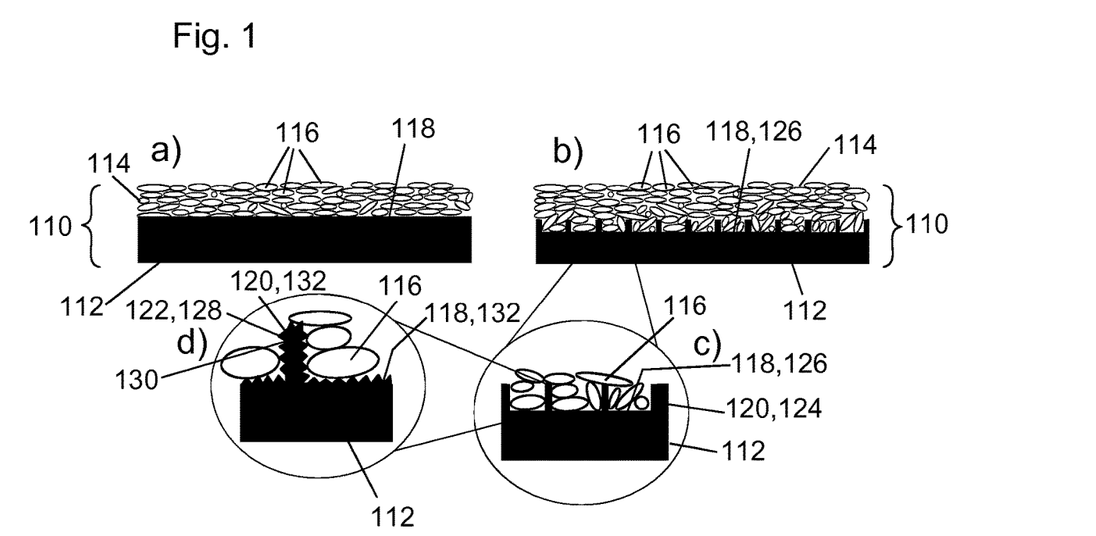
FIG. 1 a schematic comparison in the form of cross sections between a base material and a layer composite according to the prior art (FIG. 1a) and according to the present invention (FIG. 1b to 1d in each case in a higher, more detailed enlargement)

FIG. 1a schematically shows, for comparison, a cross section of an electrically conductive layer composite 110 which is known from the prior art and has an electrically conductive base material 112 which is present in the form of a metal foil and preferably has a thickness of 5 µm to 50 µm, in particular of 10 µm to 20 µm, and has a coating material 114 applied thereto in the form of a thin layer, wherein the coating material 114 comprises a plurality of electrically conductive particles 116 which should adhere very well to a surface 118 provided for receiving the particles 116.

In particular to achieve improved adhesion of the particles 116 to the surface 118 of the base material 112, FIGS. 1b to 1d show, in contrast thereto, cross sections in increasing detailed enlargement of the layer composite 110 and the base material 112 according to the present invention. For this purpose, the surface 118 of the base material 112 provided for receiving the electrically conductive particles has a hierarchical structure which comprises a first structure 120 and a second structure 122. In the present working example according to FIGS. 1b to 1d, the first structure 120 displays both first ridges 124 and also first grooves 126 relative to the surface 118 of the base material 112, while the second structure 122 has both second ridges 128 and also second grooves 130 relative to the surface 132 of the first structure 120. For the purposes of the present invention, it is unimportant that the surface 132 of the first structure 120 also partly coincides with the surface 118 of the base material 112.

Figure 2:
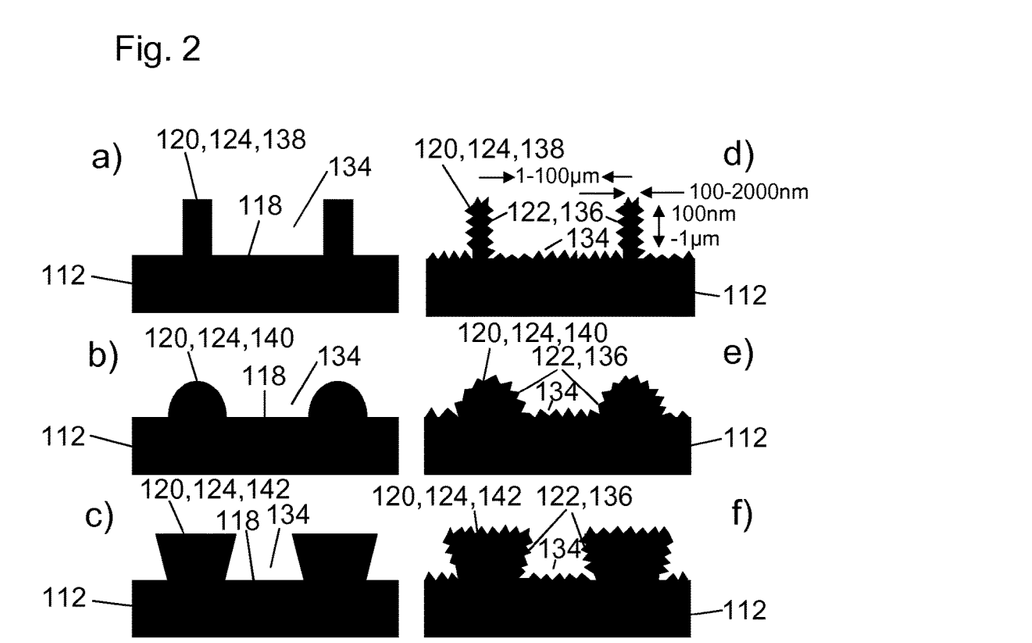
FIG. 2 a schematic depiction in the form of cross sections of the first structure (FIGS. 2a to 2c) and of the hierarchical structure (FIGS. 2d to 2f) of different types of topographies on the surface of the base material.

In FIGS. 2a to 2c, various topographies only of the first structure 120 on the surface 118 of the base material 112 are shown schematically in the form of cross sections, while FIGS. 2d to 2f show the entire hierarchical structure on the surface 118 of the base material 112. Therefrom, it can be seen that the surface 118 of the base material 112 can be equipped with different hierarchical textures. FIGS. 2a to 2f show, by way of example, channels 134 which are formed by the first structures 120 and into which the second structure 122 has been introduced in the form of ripples both in the channels 134 and also on the side walls 136 of the channels 134. The first ridges 124 can here have, in particular, an angular cross section 138 (see FIGS. 2a and 2d) or a rounded cross section 140 (see FIGS. 2b and 2e) and optionally have undercuts 142.

It can be seen from the depictions in FIGS. 2a to 2f, which are not to scale, that the first ridges 124 and the first grooves 126 in the present working examples have first dimensions in the range from 1 µm to 100 µm, while the second ridges 128 and the second grooves 130 have second dimensions in the range from 100 nm to 2000 nm, so that the specification according to the invention that the first dimensions exceed the second dimensions by a factor of at least 10 is also satisfied in the present working examples.

Figure 3:
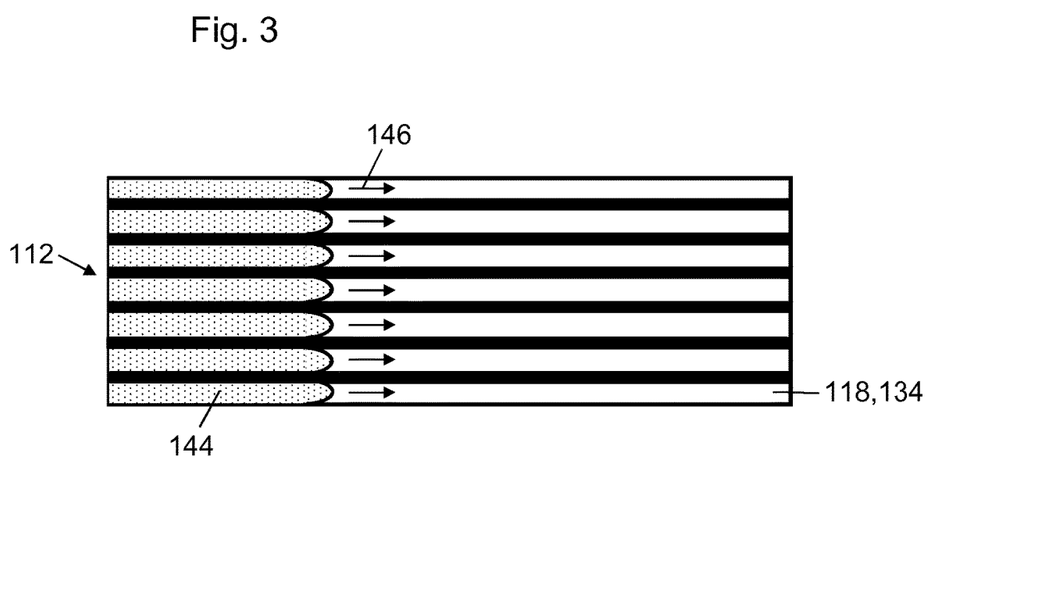
FIG. 3 a schematic depiction of the method for producing the layer composite.

FIG. 3 shows a schematic depiction of, in particular, steps c) and d) of the method of the invention for producing the layer composite 110. In step c), a slurry 144, which can, in particular, be present in the form of a pourable slip, is for this purpose applied to the surface 118 of the electrically conductive base material 112 which is provided for receiving the electrically conductive particles 116, which base material is provided with a hierarchical structure as depicted, for example, in FIGS. 2d to 2f. The slurry here comprises firstly the electrically conductive particles 116 which are preferably present in the form of primary particles, aggregates and/or agglomerates having dimensions of 10 nm to 100 µm. Secondly, the slurry comprises at least one solvent, the evaporation of which assists the drying of the slurry 144 in step e). In addition, the slurry 144 can comprise further conductivity additives and/or at least one polymeric binder.

As also shown schematically in FIG. 3, distribution of the slurry 144 over the surface 118 of the base material 112 in step d) occurs by capillary action which is exerted on the surface 118 of the base material 112. Here, the channels 134 which are present on the surface 118 of the base material 112 in the present working example additionally generate capillary forces 146 in the direction of movement, whereby very homogeneous distribution of the slurry 144 via the channels 134 is conveyed.

Figure 4:
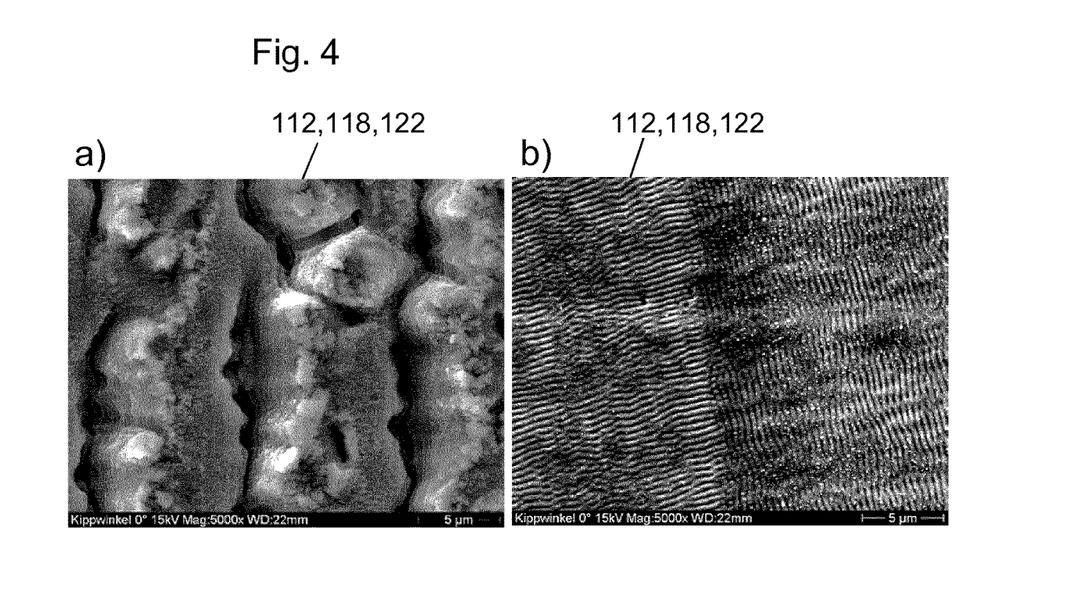
FIG. 4 scanning electron micrographs (SEM images) of a structured aluminum foil (FIG. 4a) and a copper foil (FIG. 4b)

FIGS. 4a and 4b show scanning electron micrographs (SEM images) of a structured aluminum foil (FIG. 4a) and a copper foil (FIG. 4b) which can each be used as base material 112 for producing the layer composite, e.g. as per FIG. 3. The size of the structures can be seen from the respective size bar at bottom right. The hierarchical structure on the surface 118 of the base material 112, i.e. both the first structures 120 and also the second structures 122, can be seen therefrom. Furthermore, it can be seen from FIGS. 4a and 4b that, depending on the choice of the material for the base material 112 and also depending on the setting of the parameters in the structuring of the surface 118 of the initially unstructured base material 112, different hierarchical structures can be produced on the surface 118 of the base material 112.

Figure 5:
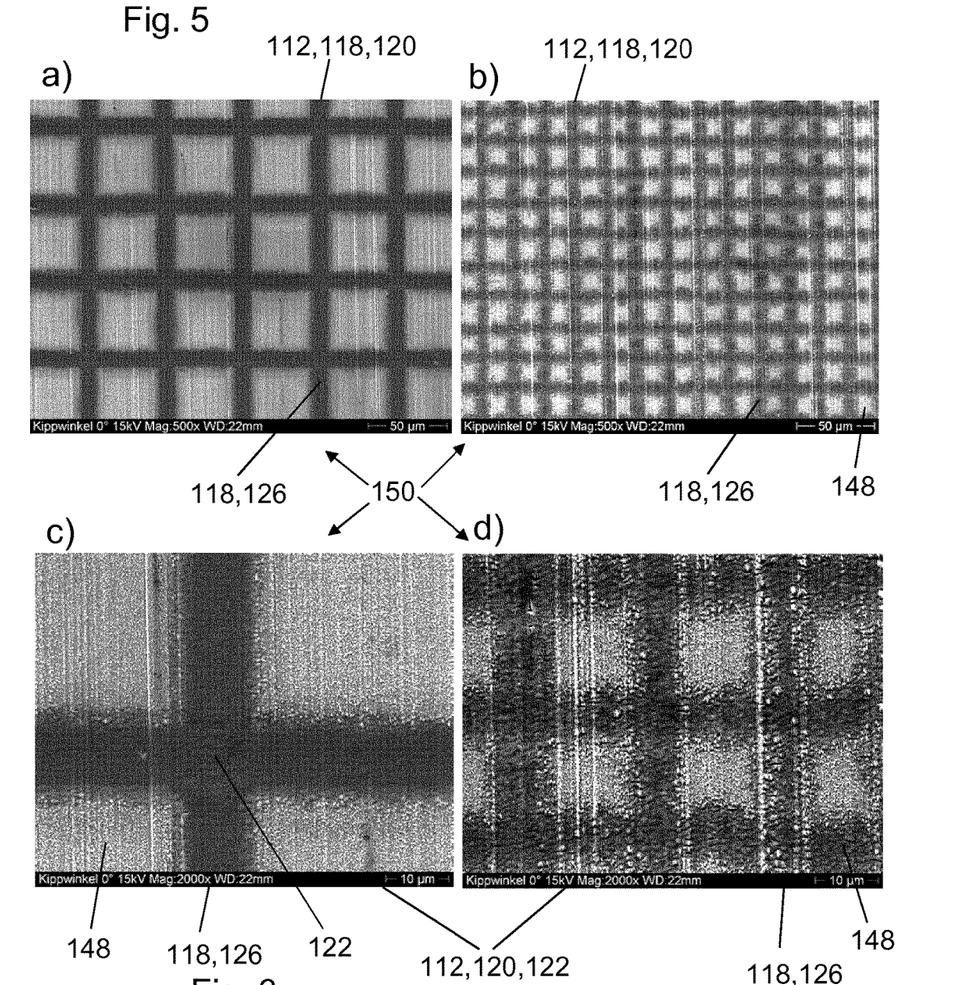
FIG. 5 SEM images of structured base materials composed of copper foils with a nickel layer applied thereto in each case, with different spacings of the first structures and in different size resolutions.

FIGS. 5a to 5d each show SEM images of variously structured base materials 112 in different size resolutions (see size bar at bottom right) or different spacings of the first structures 120. FIG. 5c depicts a detailed enlargement of a section of FIG. 5a; likewise FIG. 5d an enlargement of a section of FIG. 5b. Here, a copper foil in each case serves as unstructured base material 112 and a nickel layer applied in each case to the surface of the unstructured base material 112 serves as separate layer 148 of a further electrically conductive material. In these working examples, the surface 118 of the base material 112 is exposed at part of the first grooves 126 and the second ridges 128 and the second grooves 130 have been introduced directly into the surface 118 of the base material 112. In this manner, a topography, which can also be referred to as chemical pattern 150, is produced on the surface 118 of the base material 112 which has been configured in this manner. In the present example of the thin magnetic nickel layer as the separate layer 148 on the nonmagnetic copper foil as the unstructured base material 112, magnetic regions alternate with nonmagnetic regions over the area of the surface 118 of the base material 112. The chemical pattern 150 depicted can also be employed for introducing different functional structural groups on the various regions, e.g. to influence wetting behavior, for example, by introduction of polar or nonpolar groups for nonaqueous or aqueous slurry 144.

Figure 6:
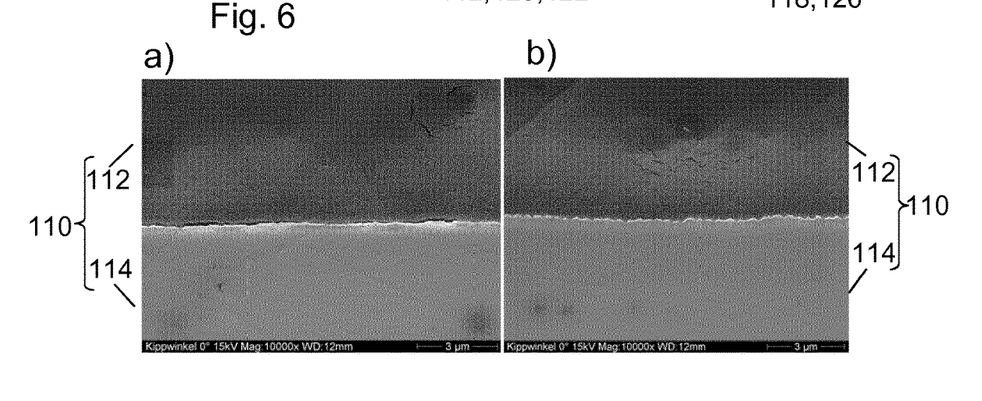
FIG. 6 SEM images of a layer composite according to the prior art (FIG. 6a) and according to the present invention (FIG. 6b)

FIGS. 6a and 6b each show SEM images of layer composites 110 which were produced on an unstructured standard copper foil as the unstructured base material 112 according to the prior art (see FIG. 6a) and on a copper foil having hierarchical structuring with nanoribs as the structured base material 112 according to the present invention (see FIG. 6b). The size of the structures can, here too, be derived from the respective size bars at bottom right. While the layer composite produced according to the prior art displays comparatively incomplete adhesion between the layers, the use of the structured copper foil having hierarchical structuring according to the present invention displays improved layer adhesion.

Figure 7:
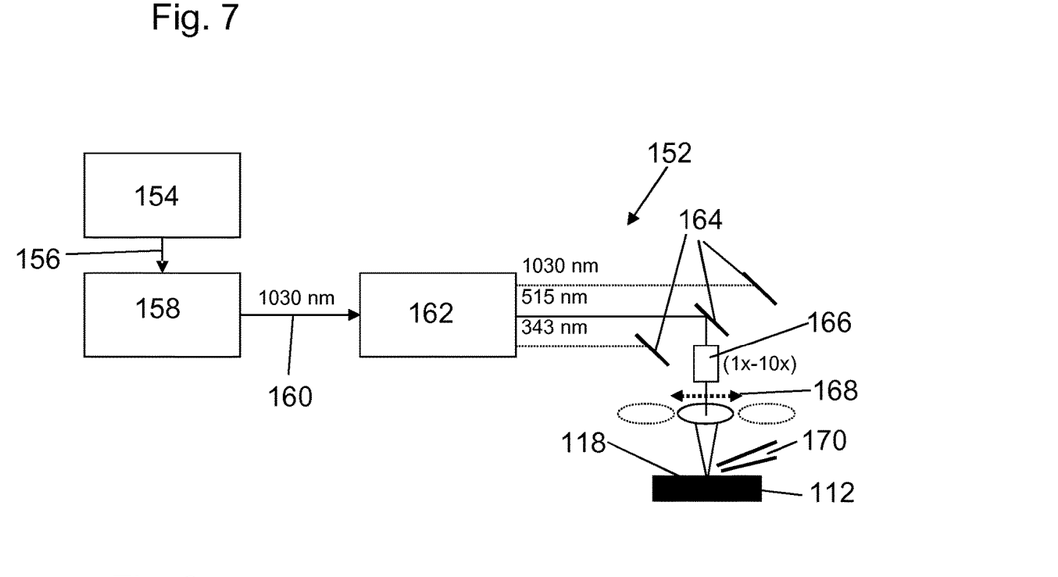
FIG. 7 a schematic depiction of an apparatus for producing an electrically conductive base material according to the invention.

FIG. 7 schematically depicts an apparatus 152 for producing an electrically conductive base material 112 according to the invention for receiving a coating material 114 comprising electrically conductive particles 116. An oscillator 154 provides a pulse frequency 156 of 1 Hz to 100 MHz, which is supplied to a femtosecond or picosecond laser 158 which generates therefrom ultrashort pulse laser radiation 160. The ultrashort pulse laser radiation 160 here has, in particular, a pulse length of 50 fs to 100 ps, an illustrative wavelength of 1030 nm, a pulse frequency of 1 Hz to 100 MHz, a power of 1 mW to 1 kW and a focus diameter of 1 μm to 1000 μm. The ultrashort pulse laser radiation 160 is passed beforehand into a frequency multiplier 162 which, by way of example, generates not only the wavelength of 1030 nm but also the further wavelengths of 515 nm (frequency doubling) and 343 nm (frequency tripling) therefrom. The ultrashort pulse laser radiation 160 having the appropriate wavelength can be supplied using appropriately arranged mirrors 164 to a beam expander 166. The desired hierarchical structure can be produced on a selected region of the surface 118 of the base material 112 using a scanner 168, in particular a scanner having f-theta lenses. Here, material removed from the surface 118 of the base material 112 can be passed to an extraction device 170.

Figure 8:
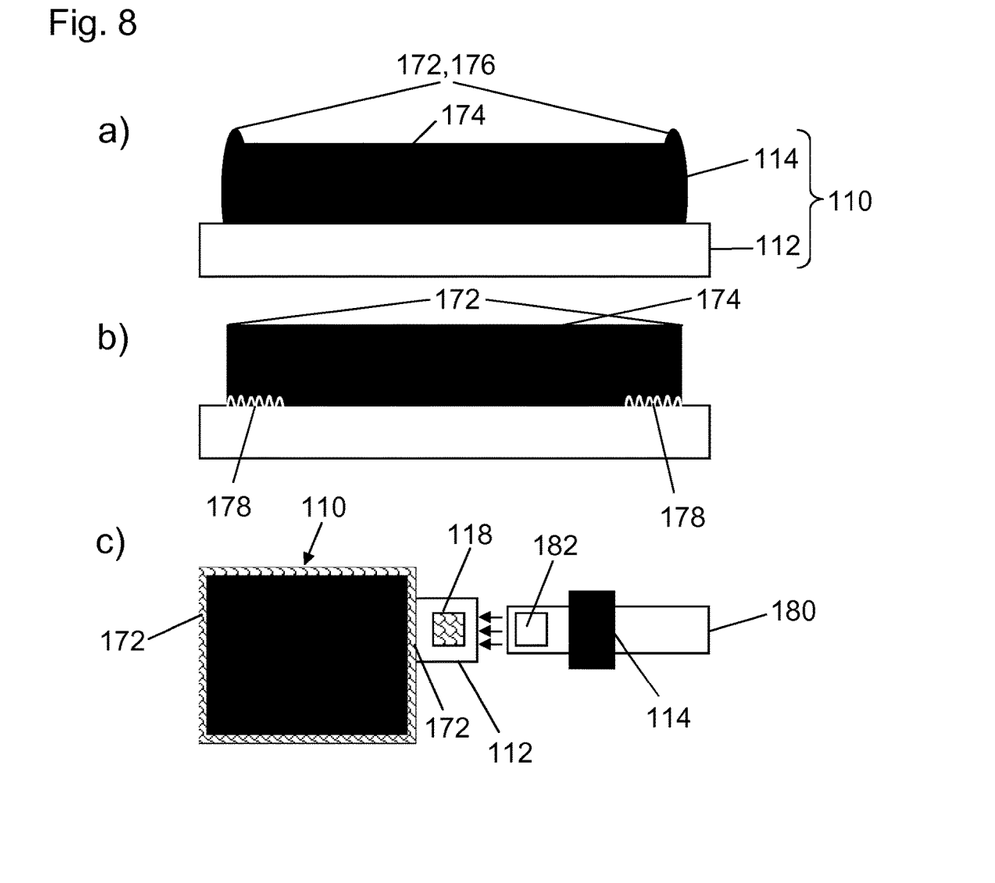
FIG. 8 a schematic depiction of selective and/or local structuring of the surface of the base material at cut edges, margins of the coating and/or weld contacts in cross section (FIGS. 8a and 8b) and in plan view (FIG. 8c).

FIG. 8b schematically shows a cross section through a layer composite 110 which is equipped with selective and/or local structuring of the surface 118 of the base material 112 at cut edges or coating margins 172 in comparison with the conventional procedure according to the prior art depicted in FIG. 8a. While, as FIG. 8a shows, a locally thickened region 176 can generally be formed on the surface 174 of the coating material 114 at the cut edges or the coating margins 172 as a result of the procedure according to the prior art, the selective and/or local structuring 178 according to the invention of the surface 118 of the base material 112 allows the surface 174 of the coating material 114 to be produced in a smooth and homogeneous manner at the cut edges or the coating margins 172 as per FIG. 8b.

FIG. 8c schematically shows a plan view of an individualized layer composite 110 which can preferably be used as electrode in a rechargeable battery. The cut edge 172 is, in this preferred working example, provided with a hierarchical structure according to the invention as described above in order to avoid delamination, in particular as a result of stamping during individualization of the layer composite 110 and/or to avoid detachment of a layer as a result of the use of ultrasound in a further treatment of the layer composite 110. The structured surface 118 on the base material 112 serving as current collector foil likewise has hierarchical structures in order to allow optimal joining of a separate current collector 180, in particular of the region 182 provided thereon for this purpose, and the current collector foil, in particular the region 118, using ultrasound. As a result of the improved contact compared to the prior art, this allows, in particular, the passage of a homogeneous electrical current from the outside into the cell, in particular into the layer composite 110 which due to appropriate hierarchical structuring of the current collector foil has optimized layer adhesion.

LIST OF REFERENCE NUMERALS 110 layer composite
112 base material
114 coating material
116 electrically conductive particles
118 surface of the base material
120 first structure
122 second structure
124 first ridges
126 first grooves
128 second ridges
130 second grooves
132 surface of the first structure
134 channel
136 side wall of the channel
138 angular cross section
140 rounded cross section
142 undercut
144 slurry (pourable slip)
146 capillary forces in the direction of movement
148 separate layer
150 chemical pattern
152 apparatus for producing the base material
154 oscillator
156 pulse frequency
158 femtosecond or picosecond laser
160 ultrashort pulse laser radiation
162 frequency multiplier
164 mirror
166 beam expander
168 scanner
170 extraction device
172 cut edge or coating margin
174 surface of the coating material 176 locally thickened region of the layer
178 selective and/or local structuring
180 current collector lead
182 region

The invention claimed is:

1. An electrically conductive base material for receiving a coating material which comprises electrically conductive particles, wherein the base material comprises a metal foil,
wherein at least one surface of the base material provided for receiving the electrically conductive particles has a first structure and a second structure,
wherein the first structure has at least one of first ridges or first grooves relative to the surface of the base material, wherein the second structure has at least one of second ridges or second grooves relative to the surface of the first structure,
wherein at least one of the first ridges or the first grooves have first dimensions, wherein at least one of the second ridges or the second grooves have second dimensions, wherein the first dimensions exceed the second dimensions by a factor of at least 10,
wherein the surface of the unstructured base material additionally has a separate layer of a further electrically conductive material,
wherein the surface of the base material is exposed at least part of the first grooves, and at least one of the second ridges or the second grooves are introduced into the surface of the base material, producing a chemical pattern topography on the surface of the base material providing for multiscale mechanical anchoring and chemical anchoring of the coating material.

2. The base material of claim 1, wherein the first dimensions are of 1 μm to 100 μm and the second dimensions are of 100 nm to 2000 nm.

3. The base material of claim 1, wherein the metal foil has a thickness of 5 μm to 50 μm.

4. The base material of claim 3, wherein the metal foil has a thickness of 10 μm to 20 μm.

5. The base material of claim 1, wherein the first structure and the second structure are produceable simultaneously by treatment of the surface of the base material using ultrashort pulse laser radiation.

6. An electrically conductive layer composite comprising an electrically conductive base material of claim 1 and a coating material comprising electrically conductive particles,
wherein the particles adhere to at least one of first ridges or to first grooves in a first structure on the surface of the base material or to at least one of second ridges or to second grooves in a second structure on the surface of the first structure.

7. The layer composite of claim 6, wherein the particles have been introduced into a phase comprising at least one of polymeric binders or conductivity additives.

8. A method for producing a layer composite of claim 6, the method comprising the following steps:
c) applying a slurry, into which at least one solvent and the electrically conductive particles have been introduced, to the surface of an electrically conductive base material provided for receiving the electrically conductive particles;
d) dispensing the slurry by capillary action over the surface of the base material; and
e) drying the slurry,
wherein the base material comprises a metal foil,
wherein at least one surface of the base material provided for receiving the electrically conductive particles has a first structure and a second structure,
wherein the first structure has at least one of first ridges or first grooves relative to the surface of the base material, wherein the second structure has at least one of second ridges or second grooves relative to the surface of the first structure,
wherein at least one of the first ridges or the first grooves have first dimensions, wherein at least one of the second ridges or the second grooves have second dimensions, wherein the first dimensions exceed the second dimensions by a factor of at least 10.

9. A current collector for an electrode material, comprising the electrically conductive base material of claim 1.

10. A rechargeable battery, comprising at least one electrically conductive layer composite of claim 6 in at least one secondary element.

11. The rechargeable battery of claim 10, wherein the rechargeable battery is a lithium ion battery.

* * * * *